US011945008B2

(12) United States Patent
Eckhard et al.

(10) Patent No.: US 11,945,008 B2
(45) Date of Patent: Apr. 2, 2024

(54) ROLLER CLEANING METHOD AND ROLLER CLEANING MACHINE

(71) Applicants: Kathrin Eckhard, Alfter (DE); Olaf Güßgen, Cologne (DE); Frank Hirschmann, Nettetal (DE)

(72) Inventors: Kathrin Eckhard, Alfter (DE); Olaf Güßgen, Cologne (DE); Frank Hirschmann, Nettetal (DE)

(73) Assignee: Hydro Aluminum Rolled Products GmbH, Grevenbroich (DE)

( * ) Notice: Subject to any disclaimer, the term of this patent is extended or adjusted under 35 U.S.C. 154(b) by 125 days.

(21) Appl. No.: 17/032,870

(22) Filed: Sep. 25, 2020

(65) Prior Publication Data

US 2021/0008605 A1 Jan. 14, 2021

Related U.S. Application Data

(63) Continuation of application No. PCT/EP2019/057728, filed on Mar. 27, 2019.

(30) Foreign Application Priority Data

Mar. 27, 2018 (EP) .................................... 18164316

(51) Int. Cl.

| | |
|---|---|
| ***B08B 3/08*** | (2006.01) |
| ***B08B 1/00*** | (2006.01) |
| ***B08B 7/04*** | (2006.01) |
| ***B08B 13/00*** | (2006.01) |
| ***B21B 45/02*** | (2006.01) |

(52) U.S. Cl.

CPC ................ *B08B 3/08* (2013.01); *B08B 1/002* (2013.01); *B08B 7/04* (2013.01); *B08B 13/00* (2013.01); *B21B 45/0275* (2013.01)

(58) Field of Classification Search

CPC .. B08B 3/08; B08B 1/002; B08B 7/04; B08B 13/00; B21B 45/0275; B21B 28/04

See application file for complete search history.

(56) References Cited

U.S. PATENT DOCUMENTS 2,234,153 A 3/1941 Herbert
5,460,023 A * 10/1995 Ginzburg ................ B21B 28/04 72/236

(Continued)

FOREIGN PATENT DOCUMENTS

CN 206997353 U 2/2018
DE 10 2012 103340 A1 10/2013

(Continued)

OTHER PUBLICATIONS

Translation of JPS57339012A. (Year: 2021).*

*Primary Examiner* — Alexander Markoff

(74) *Attorney, Agent, or Firm* — Reinhart Boerner Van Deuren P.C.

(57) ABSTRACT

A method for cleaning rollers used for metal strip processing. According to said method, the roller surface is cleaned by an aqueous alkali metal hydroxide or alkaline earth metal hydroxide washing liquid or an acidic washing liquid, the washing liquid is removed and the roller surface is dried. A machine for cleaning rollers includes a washing frame designed for positioning a roller to be cleaned, and at least one means for applying at least one washing solution to the roller surface of the roller to be cleaned.

14 Claims, 2 Drawing Sheets

(56) References Cited

U.S. PATENT DOCUMENTS

| | | | | | |
|---|---|---|---|---|---|
| 6,060,438 | A * | 5/2000 | Oleksiak | C10M 129/10 | 508/485 |
| 6,309,472 | B1 * | 10/2001 | Schonenberg | B21B 28/04 | 134/122 R |
| 8,347,682 | B2 * | 1/2013 | Gramer | B08B 3/02 | 72/39 |
| 2003/0158049 | A1 * | 8/2003 | Prince | C10M 169/04 | 508/209 |
| 2003/0164205 | A1 * | 9/2003 | Prince | C10M 129/72 | 148/29 |
| 2005/0234545 | A1 * | 10/2005 | Su | A61F 2/0077 | 623/1.46 |
| 2011/0168215 | A1 * | 7/2011 | Anglade | B08B 3/02 | 134/198 |

FOREIGN PATENT DOCUMENTS

| | | | |
|---|---|---|---|
| JP | S5739012 | A | 3/1982 |
| JP | 2001-131782 | A | 5/2001 |

* cited by examiner

ROLLER CLEANING METHOD AND ROLLER CLEANING MACHINE

CROSS-REFERENCE TO RELATED PATENT APPLICATIONS

This patent application is a continuation of PCT/EP2019/057728, filed Mar. 27, 2019, which claims the benefit of European Patent Application No. 18164316.4, filed Mar. 27, 2018, the entire teachings and disclosure of which are incorporated herein by reference thereto.

TECHNICAL FIELD OF THE INVENTION

The invention relates to a method for cleaning rolls used in steel and aluminum sheet processing in order to remove impurities such as infeed marks of the processed metal sheets and other types of impurities on the roll surface. The invention also relates to a device for cleaning rolls.

BACKGROUND OF THE INVENTION

A wide variety of rolls are used in steel and aluminum processing. These include steel and stainless steel rolls, which can also be chrome-plated if necessary. The use of rolls with ceramic surfaces is also possible. Rolls in steel and aluminum processing are used in particular for rolling, texturing or skin-passing sheet metal or metal strips. As extremely high forces are involved in these industrial rolling processes, the rolls are usually very heavy.

These work rolls are subject to certain restrictive conditions when used as a means of production in industry. Due to infeed marks on the roll surface caused by the edges of the strips to be rolled, the width of the metal strip currently being rolled may only be less than or equal to the width of the previous strip. These infeed marks occur on the surface of the roll at the position where the edges of the sheet or strip rest on the roll. The infeed marks are deposits of impurities. Once such infeed marks become permanent on the roll, the roll is subsequently used for the processing of narrower or equally wide sheets or strips so that the impurities (infeed marks) on the roll do not leave any marks on the metal sheets or strips currently being processed.

On the one hand, this condition limits flexibility in the production sequence of metal sheets from wide to narrow, and, on the other hand, even the narrowest strip determines the point in time when the roll must be reworked to remove the infeed marks, regardless of the other quality/wear of the roll surface and the actual number of operating hours. Apart from planning flexibility, considerable costs are caused by mechanically reworking the rolls. Mechanical roll reconditioning by grinding requires not only the removal of the infeed marks but also the complete re-preparation of the roll surface. Unless the rolls are ground and have a smooth surface, the desired surface topography may have to be readjusted after grinding, in some cases by very complex texturing methods (EDT, PDT). In the EDT process (electro-discharge texturing), the roll surface is roughened by spark erosion or electrical discharge machining. This is done by moving the work roll past an electrode in a tank that contains a dielectric. Small craters are knocked into the roll surface by spark discharge. If necessary, a further process step to restore (manifest) the desired roll surface may also be required in addition to chrome plating. The manifestation of the suitable surface texture on a roll is—also in terms of logistics—complex and expensive. An extension of the reworking intervals could therefore save considerable costs.

It is therefore desirable to significantly shorten the time required to renew a production roll and on the other hand to extend the period of use between the required renewals of the roll and thus also to significantly extend the overall life of a roll.

U.S. Pat. No. 2,234,153 describes the cleaning of metal sheets and metal strips and a device for removing lubricants and other materials that have accumulated on the metal sheets and metal strips. This document is based on a state-of-the-art process in which the above-mentioned impurities on the metal strips are removed after treating the rolls. U.S. Pat. No. 2,234,153 recommends spraying the metal strip with cleaning liquid during rolling and also cleaning the back-up rolls with the cleaning liquid in order to remove the impurities that are passed onto the work rolls. Cleaning of the work rolls is not described.

JP S 57 39012 A describes the removal of aluminum and iron powder from the surface of work rolls by spraying them with an alkaline cleaning agent when the work roll is not in operation and subsequently spraying the roll surface with water from the nozzle that releases a coolant during rolling.

US 2011/0168215 A1 describes the cleaning of rolls, in particular those used in roller mills in the electroplating industry, from impurities such as zinc particles that adhere to the roll surface, whereby high pressure is applied to spray the cleaning liquid onto the roll surface.

DE 10 2012 103 340 A1 describes the cleaning of a transfer roller in a digital printer in which a scoop roller conveys cleaning liquid from a wet chamber and applies an even layer of cleaning liquid to the transfer roller without the transfer roller coming into contact with the wet chamber.

BRIEF SUMMARY OF THE INVENTION

The object of the invention is therefore to provide a method and a device for replacing a used production roll that requires cleaning or that needs to be replaced as far as possible in the own production plant and by a simpler, less time-consuming process than mechanical preparation by grinding.

This objective is accomplished according to a first principle of the invention by a method for chemically cleaning metal rolls whereby the roll surface of a work roll is cleaned by using at least one aqueous alkali metal hydroxide or alkaline earth metal hydroxide washing solution or at least one acidic washing solution and rinsing with water, for example. The roll surface can then be dried. This method allows the impurities on the roll, which mainly contain metal abrasions, to be removed safely.

The above-mentioned objective is further accomplished according to a second principle of the invention by a device for cleaning rolls used for metal strip processing, preferably steel and aluminum strip processing. The said device comprises a washing mount designed for positioning a roll to be cleaned and at least one means for applying at least one washing solution to the roll surface of the roll to be cleaned. The apparatus according to the invention may in particular be designed to implement and/or control the method according to the first principle of the invention.

The method according to the invention and the use of the device according to the invention considerably extend the intervals between the mechanical reworking of the rolls by grinding. Greater flexibility is achieved in the sequence of production as the method and device according to the invention simplify the removal of infeed marks on rolls and quickly restore the roll to a state that allows wider strips to be processed. The method and device according to the invention also facilitate a longer overall service life of a roll. The method and device according to the invention are also effective in removing markings from impacts and folds resulting from rolling. Mechanical damage to a roll surface cannot be rectified by the method according to the invention.

This method allows cleaning of the surface of work rolls of any kind that are used in metal processing. The rolls to be cleaned may have a textured or ground surface.

Impurities to be removed from the roll surface include infeed marks, rolling oil residues, rolling emulsion residues, marks on the roll surface resulting from impacts and other impurities. However, the surface structure of the roll to be cleaned should not be damaged.

A first and a second washing solution are preferably an alkali metal hydroxide solution or alkaline earth metal hydroxide solution. The first and the second washing solution are preferably a diluted aqueous alkali metal hydroxide solution, particularly preferably a sodium hydroxide solution. In a particularly preferred embodiment of the method according to the invention, the first and the second washing solution are used in succession to clean a roll. The first washing solution may have a higher concentration of alkali metal hydroxide or alkaline earth metal hydroxide than the second washing solution. For example, the alkali metal hydroxide concentration of the first washing solution can be 2 to 4% by weight, relative to the weight of the washing solution. The alkali metal hydroxide concentration of the second washing solution can, for example, be 0.3 to 1% by weight, relative to the weight of the washing solution. If the rolls are treated with two alkali metal hydroxide solutions having different concentrations, preferably no water rinsing is to be performed between the two alkali metal hydroxide washing runs.

Preferably, the roll is rinsed with water (third washing solution) following cleaning with the alkali metal hydroxide solution/s. This treatment serves to remove the washing solution containing alkali metal hydroxide. The water used is preferably demineralized water (DEMIN water). Demineralized water, for example, is passed three times through an ion exchanger for desalination and thus purified.

Finally, after rinsing with water, the roll can be treated with a lower alkanol with 1, 2, 3 or 4 carbon atoms, the mixture of a lower alkanol or ketone with water (fourth washing solution), in order to remove any remaining impurities on the roll surface and/or also to remove water and to dry the roll surface. The lower alkanol is preferably an alkanol with two or three carbon atoms, for example ethanol, isopropanol, propanol or mixtures thereof. Isopropanol is particularly preferably used as the fourth washing solution. Particularly preferred for cleaning and drying the roll surface are azeotropic mixtures of alkanol or ketone.

The washing solutions containing alkali metal hydroxide may preferably contain additional components such as a surfactant, a degreasing agent and/or other substances. These additional components may be selected depending on the type and quantity of impurities in the washing liquid.

Suitable surfactants are, for example, non-ionic and anionic surfactants. Their concentration in the washing liquid may be 1 to 5% by weight, relative to the weight of the washing solution.

Chelating degreasing agents are preferably used as degreasing agents. Chelating degreasing agents prevent the formation of an emulsion. Suitable chelating degreasing agents are for example polyphosphates, gluconates, oxalates and citrates. The concentration of the degreasing agent in the washing solution can be up to 3% by weight, relative to the weight of the washing liquid.

According to a particularly preferred embodiment of the method according to the invention, the roll is cleaned in four steps. Four cleaning solutions are used, namely the first washing liquid, thereafter the second washing liquid, then treatment with water as the third washing liquid and finally treatment with an alkanol or an alkanol/water mixture as the fourth washing solution. Preferably, these four washing steps are carried out immediately in succession. Consequently, the following process steps are preferably performed in succession:

Cleaning the roll with the first washing solution containing alkali metal hydroxide and a degreasing agent Cleaning the roll with the second washing liquid containing alkali hydroxide Rinsing the roll with demineralized water, and Cleaning the roll with an alkanol or an alkanol/water mixture and subsequently drying the roll The alkaline cleaning method can be used to clean rolls that have been used to process aluminum or steel strips. This alkaline roll cleaning method is advantageous for steel rolls because the roll surface is passivated by alkali.

According to an alternative embodiment of the method for cleaning rolls according to the invention, the washing liquid is a mineral acid or carboxylic acid washing solution. One or more acidic washing liquids can be used for cleaning rolls used in steel strip processing including strips of high and low-alloy steels as well as for processing strips of copper, titanium or magnesium or alloys of these metals.

As mineral acids, preferably nitric acid and sulfuric acid can be used in the acidic washing liquid. Formic acid and acetic acid are preferably used as carboxylic acids. As in the alkaline cleaning process, a first acidic washing liquid can be used initially, followed by a second acidic washing solution. The first acidic washing liquid can have a higher acid concentration than the second acidic washing liquid. For example, the concentration of acid in the first acidic washing liquid can be 2 to 4% by weight, relative to the weight of the first acidic washing liquid. The concentration of acid in the second acidic washing liquid can, for example, be 0.3 to 1% by weight, relative to the weight of the second acidic washing liquid. The acidic washing solutions may contain the same additives in the same quantity as in the first and second washing liquids used in the alkaline roll cleaning process. The third and fourth washing liquids in the acid roll cleaning process are the same as in the alkaline roll cleaning process.

Thus, the acid roll cleaning process can preferably be carried out as follows:

Cleaning the roll with the first acidic washing solution containing mineral or carboxylic acid and a degreasing agent Cleaning the roll with the second washing solution containing mineral or carboxylic acid Rinsing the roll with demineralized water, and Cleaning the roll with an alkanol or an alkanol/water mixture and subsequently drying the roll The first and second washing solutions or the first and second acidic washing solutions dissolve the abrasion or other reaction products from the production process on the surface of the roll. Essentially, the roll material is not attacked or damaged. The first and second washing liquids used according to the invention are preferably washing solutions.

According to the method of the invention, the rolls can basically be cleaned manually. The washing solutions can thus be applied or sprayed onto the roll surface by hand, with a cloth, a coating roller or any other suitable device. During cleaning, the roll to be cleaned can be rotated mechanically or manually. Alternatively, the roll can be partially or fully immersed in a basin containing washing solution and rotated. Preferably, the roll is only partially immersed in a basin such that only a part of the roll surface is immersed in the washing solution. One or more cylindrical brushes, rubber-coated pinch rollers, non-woven rollers, nozzle bars and/or a combination thereof can intensify the cleaning of the roll surface.

The device according to the second principle of the invention possesses a washing mount that is designed for positioning a roll to be cleaned. The washing mount is preferably designed to rotate the roll along its own axis. The washing mount can also be used to position the roll relative to the device. For example, the roll can be swivel-mounted and/or positioned such that its height can be adjusted in the washing mount. In particular, the roll is positioned or supported on the bearing sections on which the roll is also supported when used in metalworking. Adapters for positioning different types of rolls can be provided. Chocks, i.e. rolls with their own bearing can be used from the production process. This has the advantage of saving the time for disassembling and re-assembling the chocks. The washing mount, however, can also be equipped with its own bearings for the rolls.

The means for applying at least one washing solution of the device according to the second principle of the invention is especially designed for sprinkling and/or spraying the roll surface with a washing solution. The means for applying at least one washing liquid can also comprise at least one washing solution itself, in particular an aqueous alkali metal hydroxide or alkaline earth metal hydroxide washing solution. One or more washing liquids may be provided in tanks. For further possible compositions of one or more washing liquids, please refer to the above description of the method.

In an embodiment of the device, the means for applying at least one washing solution possesses at least one nozzle and/or at least one scoop roller. One nozzle can be arranged for spraying the roll surface, whereby in particular the roll is to be mounted such that it can be rotated and sprayed along its entire surface. Several nozzles can be arranged in the direction of the axis of the roll such that the nozzles can apply the washing solution as uniformly as possible along the axis of the roll surface. Alternatively or additionally, one or more movable nozzles can be arranged such that they can traverse the surface along the roll axis. The device may be equipped with at least one pump to pressurize the contents of the nozzle. Alternatively, the device can also be operated with one pump for each of the four tanks containing the cleaning liquid.

In particular, a scoop roller can be designed to apply a washing solution to the roll surface by virtue of contact between the scoop roller and the roll surface. Preferably, the roll and scoop roller are arranged such that the roll and scoop roller can roll over each other. The rotation of the roll and the scoop roller thus ensures that the washing solution is applied along the entire surface of the roll. For this purpose, special aids in particular, for example at least one electric motor for rotating the roll and/or the scoop roller, are to be provided in order to drive or rotate a roll in the washing mount and/or a scoop roller.

A scoop roller can be mounted by a spring-loaded mechanism, hydraulic or pneumatic system or by allowing the action of gravity such that the scoop roller is brought into contact with the roll surface at a defined and in particular adjustable pressure. In addition to applying a washing solution, a scoop roller can also be designed to provide a mechanical action on the roller surface, for example a brushing action to assist cleaning. The surface material of the scoop roller can be selected such that it is suitable for improving the application of a washing solution and/or the mechanical action. Preferably, the device should be equipped with a scoop roller provided with a non-woven fabric on its surface. The non-woven fabric can both facilitate the absorption of a washing solution by the scoop roller and act on the roll surface with a brushing action. Alternatively or additionally, the surface of the scoop roller can be equipped with a rubber coating.

A scoop roller is in particular used in conjunction with a liquid tank or basin, whereby the basin can be mounted below the roll. The basin can thus collect the used washing solution, whereby aids are to be provided in particular for recirculating the used washing solution. The used washing solution can thus be recirculated to the tank and/or to the means for applying at least one washing solution for further use.

An embodiment of the device provides for a scoop roller with a basin, whereby the scoop roller can be arranged such that it is simultaneously in contact with a washing solution in the basin and with the roll surface. The scoop roller can thus scoop the washing solution from the basin and apply it onto the roll surface.

In a preferred embodiment, the device possesses at least one combination of a scoop roller and a nozzle. The nozzle can be used in particular for the application of a washing solution, whereby the scoop roller enhances the cleaning effect and in particular enables the scooping of the washing liquid from a basin. The nozzle can be designed to spray the roll surface and/or the scoop roller with the washing solution. Preferably, the nozzle is designed to spray the washing solution in the contact area between the roll surface and the scoop roller.

As described earlier, the roll and scoop roller can be arranged such that the roll and scoop roller can roll over each other. For example, the contact between the surfaces enables the scoop roller to be rotated when the roll is rotated and vice versa. One embodiment provides for braking the rotational movement of the roll and/or the scoop roller so that the rotational speeds of the roller and working rollers are different relative to each other. This creates a slip between the roll surface and the surface of the scoop roller which can further improve the cleaning process and in particular increase a mechanical effect of the scoop roller, for instance a brushing effect. Alternatively or additionally, both roll and scoop roller can be driven such that a slip is created.

One embodiment provides for several tanks for washing solutions, whereby these tanks in particular provide different washing solutions or washing liquids. This allows—as in the description for the method—several cleaning steps to be conducted with different washing solutions or washing liquids. Different washing solutions/liquids can be applied by a specifically dedicated aid intended for the application of the washing liquid. In particular, however, different washing solutions/liquids are applied via common means of application. The tanks can be connected to the aids for applying at least one washing solution via a valve unit, whereby the valve unit controls which washing liquid is supplied to the relevant application aid.

The device can be upgraded by providing at least one aid for removing a washing solution/liquid from the roll surface. The device may, for example, include aids for rinsing, in particular for applying water, alkanol or an alkanol/water mixture and/or the aid for applying at least one washing solution may be designed to apply water, alkanol or an alkanol/water mixture to the roll surface. For example, a water tank and/or supply lines to a water supply system, which are connected in particular to at least one nozzle, are provided. The water provided is preferably demineralized water. At least one scraper or squeegee that can be brought into contact with the roll surface in order to reduce the quantity of liquid (washing liquid/water) on the roll surface can be provided.

According to a particularly preferred embodiment of the invention, squeegees are arranged in the device such that, by removing the liquid on the lateral parts of the roll to be treated, they prevent the dripping of any liquid onto chocks and/or journals of the roll.

According to a further embodiment of the device, at least one means for drying the roll surface is provided so as to accelerate the cleaning process. An air blower and/or a heating unit, for example, can be used for purposes of drying the roll surface.

The device can be designed for automated cleaning. A control device designed to perform and/or control a method according to the first principle of the invention may be provided. The control device may, for example, initiate the preset time of action of specific washing solutions on the roll surface (in particular in a specific sequence). Ready-to-use cleaning programs can be used for the control unit. The control unit regulates and/or monitors, for example, the rotation speed of the roll/scoop roller, spray pressure of the washing solution and/or counterpressure of the scoop roller. The control unit can also initiate the removal of the washing solution and/or initiate drying of the roll surface. In particular, at least one sensor unit is provided which can communicate with the control unit, for example a temperature sensor and/or a level sensor in a basin for the washing solution/liquid. The control unit can be designed to perform a level control of the filling level in a basin.

Furthermore, the roll can be cleaned mechanically in a dedicated roll washing station, whereby the roll can be rotated fully automatically and the washing solutions are sprinkled and/or sprayed in succession onto the roll. The rotational speed of the roll, the spray pressure of the washing solution, the counterpressure of a scoop roller, for example a non-woven fabric scoop roller, and the duration of action of the washing solution can be varied and saved in ready-to-use cleaning programs so as to also facilitate an automated washing process. The treatment liquids can be collected in a trough located directly under the washing station or can be fed directly to the wastewater treatment system. Preferably, drying of the roll should be avoided before cleaning the roll with the second and third washing solutions.

DETAILED DESCRIPTION OF PREFERRED EMBODIMENTS

Figure 1:
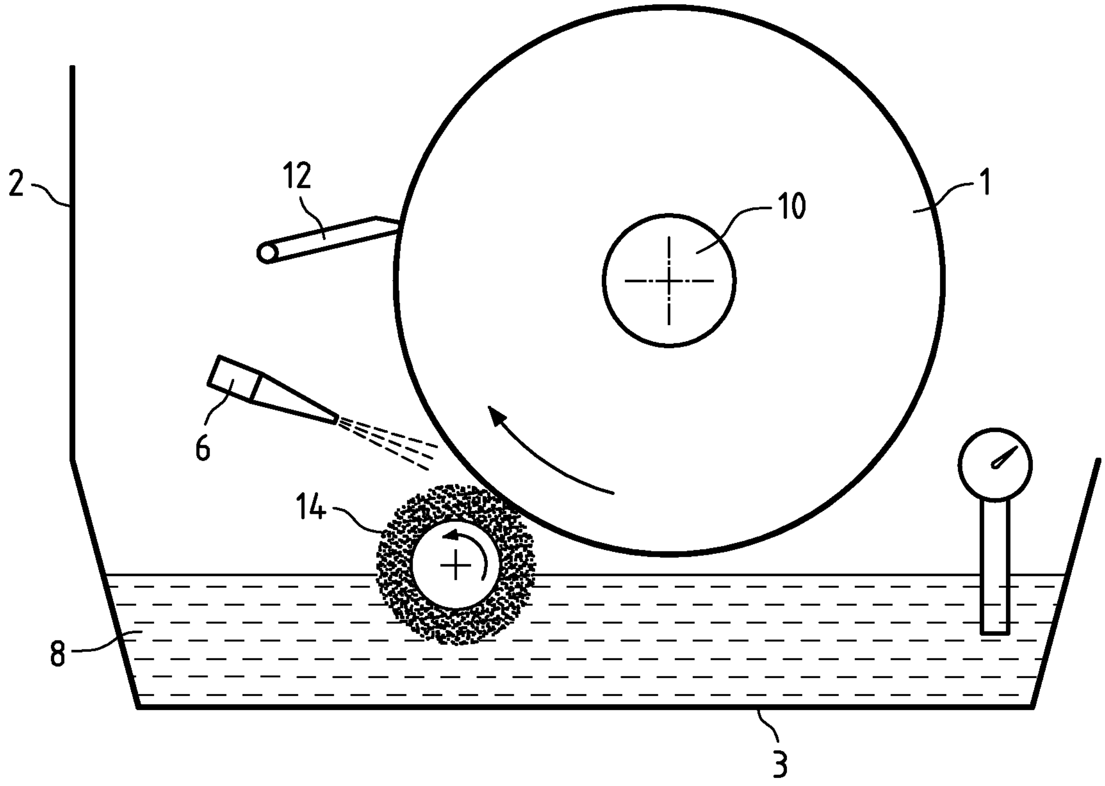
FIG. 1 shows a schematic representation of an example of a device—in side view with the roll to be cleaned—for performing the method according to the invention.
Figure 2:
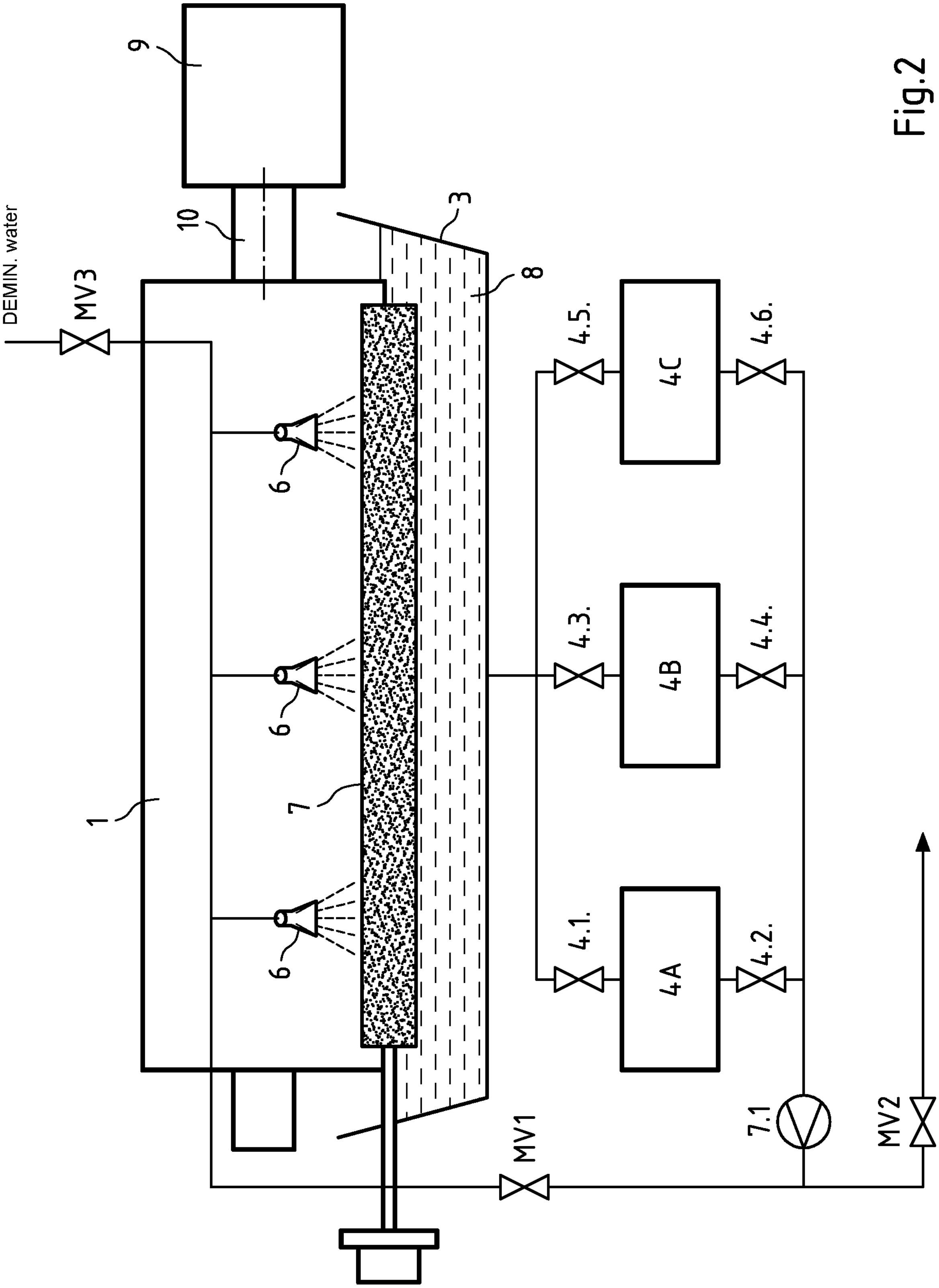
FIG. 2 shows a schematic representation of an example of a device in front view with roll.

An example of a roll washing system for implementing the method according to the invention comprises a washing mount (10) on which the roll (1) is placed for cleaning. The roll (1) is mounted on the washing mount (10) such that it can rotate about its own axis. A drive (9) is used to rotate the roll (1). A basin or trough for collecting liquid (8) is located under the roll (1). This basin (8) can be filled with the respective washing solution or with water during the roll cleaning process and can collect washing solutions while the roll (1) is being cleaned. A rotatable scoop roller (14) is mounted parallel to the longitudinal axis of the roll (1) to be cleaned. A spring-loaded mechanism can be used to allow the scoop roller (14) to come into contact with the roll (1) to be cleaned. The scoop roller (14) can be used to apply a washing solution from the basin (8) to the roll (1). It can also be used to brush the surface of the roll (1). An electric motor is used to rotate the scoop roller (14) and/or the roller (1) in both directions of rotation, whereby the speed of rotation can be set to 20 m/min or to another speed. An aid for braking the speed of rotation of the scoop roller (14) is to be provided. The respective washing solutions can also be applied to the roll (1) to be cleaned via nozzles (6). The nozzles can spray the washing solution directly onto the roll surface and/or onto the scoop roller (14). The scrapers/squeegees (12) serve to reduce the quantity of liquid (washing liquid/water) on the surface of the roll, in particular at the edges of the roll (1) to be cleaned, after a wash cycle.

In an example of an automated cleaning process according to the invention, the roll (1) to be cleaned is positioned on the washing mount (10) in the device or roll washing system. To commence cleaning, valve MV1 is opened and pump P1 is switched on. Electric motor M1 makes the roll to be cleaned rotate about its own axis. A chelating degreasing agent in a strong alkaline washing solution (solution 1; 2 to 4% by weight alkali hydroxide) stored in a storage tank (4A) is applied to the roll and the roll is initially cleaned with this solution. The scoop roller (7) brushes roll 1 and supports the cleaning process. Solution 1 is drained and collected in basin 8. The used solution 1 in the basin (8) is returned to storage tank 4A via open valve 4.1. After 30 minutes of cleaning the roll (1) with solution 1, valve 4.2 is closed. If there is no more washing solution in the basin, valve 4.1 is also closed. Valve 4.4 is opened. An alkaline washing solution 2 with an alkali hydroxide concentration of 0.5 to 1.0% by weight (solution 2), regulated by valve 4.4, flows from tank 4B to the nozzles (6) from where it is applied to the roll (1) for further cleaning. Washing liquid 2 also contains a chelating degreasing agent. After 30 minutes, the supply of solution 2 to the nozzles (6) is interrupted by valve 4.4. After the used solution 2 has drained from the basin (8) into storage tank 4B, valve 4.3 is also closed. Fully demineralized water is now supplied via valve MV3 to the nozzles (6) and subsequently to the roll (1) for further cleaning. This cleaning step with demineralized water (demineralized water—washing liquid 3) can also take 30 minutes and is supported by the scoop roller (14). After the used demineralized water is drained out of the basin (8), the roll (1) is washed with isopropanol (solution 4) for purposes of cleaning as well as for removing washing water. This step can also be performed for 30 minutes. Isopropanol is drained from the basin (8) and the roll (1) is then dried further. An air blower can be used for drying the roll.

In another example of an automated cleaning method according to the invention, the roll (1) to be cleaned is positioned on the washing mount (10) of the roll washing system in a customized device. Via open valve MV1 and by operating the pump (7.1), the alkaline degreasing washing liquid is now applied via flush nozzles from the storage tank (4A), by opening valves 4.2. and 4.1., onto the scoop roller (14) in the top area. The roll to be cleaned is now made to rotate at an appropriate speed (e.g. 10 rpm) via the drive and coupling unit (9, 10) before the scoop roller is moved up to the roll. A pneumatic or hydraulic system can be used to determine the contact pressure of the scoop roller, which is now either rotated freely or slowed down or driven.

The "type of rotation" selected for the scoop roller depends on various factors such as the coating of the scoop roller, the material of the work roll and the type and intensity of the impurities. The washing solution is now applied to the roll to be cleaned in a uniform film layer. Excess liquid is drained into the trough/basin located below, whereby scrapers/squeegees (12) ensure that no washing solution reaches the edge or even the journal of the roll.

The liquid (8) collected in the trough/basin (3) can either be recirculated and allowed to flow freely to the tank directly (or a pump) or, controlled by a level measurement, it can be accumulated so that the washing roller can also be used as a scoop roller (FIG. 1).

After a preset washing time, the first washing solution is now "run over" by the second washing liquid from tank 4B by first opening valves 4.4. and 4.3. and, shortly afterwards, closing valves 4.2. and 4.1.

This "moving from one into another" ensures that the roll to be washed does not run dry. Dry running must be prevented in so far as, for example, some metals can form oxide compounds which very quickly become insoluble and reach a degree of hardness that exceeds that of the roller surface and could cause pressure marks later in the process.

After another preset washing time, washing solution 2 is drained off and rinsing with demineralized water fed via valve MV3 is now carried out. In this context too, an early switchover prevents the roll from running dry prematurely.

Finally, rinsing is carried out preferably with an aqueous solution with an isopropanol content of 10 to 20% that is fed from tank 4C, before the scoop roller (14) is retracted and the roll (1) continues to rotate and is dried thoroughly either by the ambient air or with the help of a blower. Once dry, rotation is stopped and the roll, which is ready for use, is discharged from the washing system.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for cleaning rolls used in metal strip processing, comprising:

first cleaning a roll surface of a roll with a first alkaline washing liquid comprising an aqueous alkali metal hydroxide or an alkaline earth metal hydroxide, second cleaning the roll surface with at least one second alkaline washing liquid comprising an aqueous alkali metal hydroxide or an alkaline earth metal hydroxide, whereby the first alkaline washing liquid has a higher concentration of hydroxide ions than the at least one second alkaline washing liquid, rinsing the roll surface with water upon completion of the first cleaning and the second cleaning.

2. The method according to claim 1, wherein the concentration of alkali metal hydroxide or alkaline earth metal hydroxide in the first alkaline washing liquid is 2 to 4% by weight, relative to the weight of the first alkaline washing liquid.

3. The method according to claim 1, wherein the concentration of alkali metal hydroxide or alkaline earth metal hydroxide in the at least one second washing liquid is 0.3 to 1% by weight, relative to the weight of the at least one second washing liquid.

4. The method according to gclaim 1, wherein the first and/or the at least one second alkaline washing liquid contains a degreasing agent.

5. The method according to claim 1, wherein the following steps are carried out in succession on a roll to be cleaned:

cleaning the roll with the first alkaline washing liquid and a degreasing agent, cleaning the roll with the at least one second alkaline washing liquid, rinsing the roll with demineralized water as a third washing liquid, and cleaning the roll with a fourth washing liquid that contains an alkanol or an alkanol/water mixture and subsequently drying the roll.

6. The method according to claim 5, wherein the concentration of alkali metal hydroxide or alkaline earth metal hydroxide in the first alkaline washing liquid is adjusted to 2 to 4% by weight relative to the first alkaline washing liquid and the concentration of alkali metal hydroxide or alkaline earth metal hydroxide in the at least one second alkaline washing liquid is adjusted to 0.3 to 1% by weight relative to the weight of the at least one second alkaline washing liquid.

7. The method according to claim 5, wherein the roll is not allowed to run dry during the cleaning and rinsing steps.

8. The method according to claim 7, further comprising drying the roll surface.

9. The method according to claim 1, wherein the first cleaning and the second cleaning are performed in a device and wherein the method further comprises:

positioning the roll in a washing mount of the device, and applying the first alkaline washing liquid and the at least one second alkaline washing liquid using at least one first aid of the device onto the roll surface.

10. The method according to claim 9, wherein the at least one first aid comprises at least one nozzle and/or at least one scoop roller and wherein the method further comprises applying the first alkaline washing liquid and the at least one second alkaline washing liquid using the at least one nozzle and/or the at least one scoop roller.

11. The method according to claim 10, wherein the at least one first aid comprises the at least one scoop roller, whereby the method further comprises:

arranging the roll and the at least one scoop roller such that the roll and the at least one scoop roller roll over each other; and providing a means to slow down the rotation speed of the roll and/or the at least one scoop roller.

12. The method according to claim 9, wherein the device comprises a tank for each of the first alkaline washing liquid and the at least one second alkaline washing liquid, whereby the method further comprises controlling the flow of the first alkaline washing liquid and the at least one second alkaline washing liquid from the tanks to the at least one first aid by means of valve units.

13. The method according to claim 9, wherein the device further comprises at least one second aid for removing the first alkaline washing liquid and/or the at least one second alkaline washing liquid from the surface of the roll and wherein the method further comprises removing the first alkaline washing liquid and/or the at least one second alkaline washing liquid using the at least one second aid.

14. The method according to claim 9, wherein the device further comprises at least one third aid for drying the roll surface and wherein the method further comprises drying the roll surface.

* * * * *